(12) United States Patent
Inuzuka et al.

(10) Patent No.: US 8,088,180 B2
(45) Date of Patent: Jan. 3, 2012

(54) LENS DYEING METHOD AND APPARATUS FOR PRODUCING DYEING BASE BODY FOR DYEING LENS

(75) Inventors: Minoru Inuzuka, Hazu-gun (JP); Hirokazu Hyodo, Toyohashi (JP)

(73) Assignee: Nidek Co., Ltd., Gamagori-shi (JP)

( * ) Notice: Subject to any disclaimer, the term of this patent is extended or adjusted under 35 U.S.C. 154(b) by 537 days.

(21) Appl. No.: 11/905,089

(22) Filed: Sep. 27, 2007

(65) Prior Publication Data
US 2008/0078037 A1    Apr. 3, 2008

(30) Foreign Application Priority Data

Sep. 29, 2006  (JP) ................................. 2006-269845
Mar. 30, 2007  (JP) ................................. 2007-090813

(51) Int. Cl.
*D06P 5/28* (2006.01)
(52) U.S. Cl. ..................................... 8/471; 8/467; 8/470
(58) Field of Classification Search ....................... 8/471
See application file for complete search history.

(56) References Cited

U.S. PATENT DOCUMENTS

| | | | | |
|---|---|---|---|---|
| 6,520,999 | B1 * | 2/2003 | Kamata et al. | 8/471 |
| 2004/0075724 | A1 * | 4/2004 | Inuzuka | 347/100 |
| 2006/0181676 | A1 * | 8/2006 | Tucker et al. | 351/162 |

FOREIGN PATENT DOCUMENTS

| | | |
|---|---|---|
| EP | 1 249 334 B1 | 8/2004 |
| JP | A-2001-059950 | 3/2001 |
| JP | A-2002-258002 | 9/2002 |

* cited by examiner

*Primary Examiner* — Harold Pyon
*Assistant Examiner* — Katie L Hammer
(74) *Attorney, Agent, or Firm* — Oliff & Berridge, PLC

(57) ABSTRACT

A lens dyeing method comprising the steps of: (a) determining a print area to be formed on a dyeing base body based on information entered to dye a predetermined area of a surface of a lens to be dyed with desired hue and almost uniform color density so that the print area has a diameter larger than that of the lens surface area and the color density of the print area concentrically changes from a central portion to a peripheral portion in a stepwise or linear manner; (b) applying a dyeing ink containing a sublimable dye onto the base body to form the determined print area on one surface of the base body; and (c) placing the base body and the lens so that the print area formed surface and the lens surface area to be dyed face each other in noncontact relation under substantially a vacuum condition, and heating the base body to deposit the dye onto the lens.

1 Claim, 4 Drawing Sheets

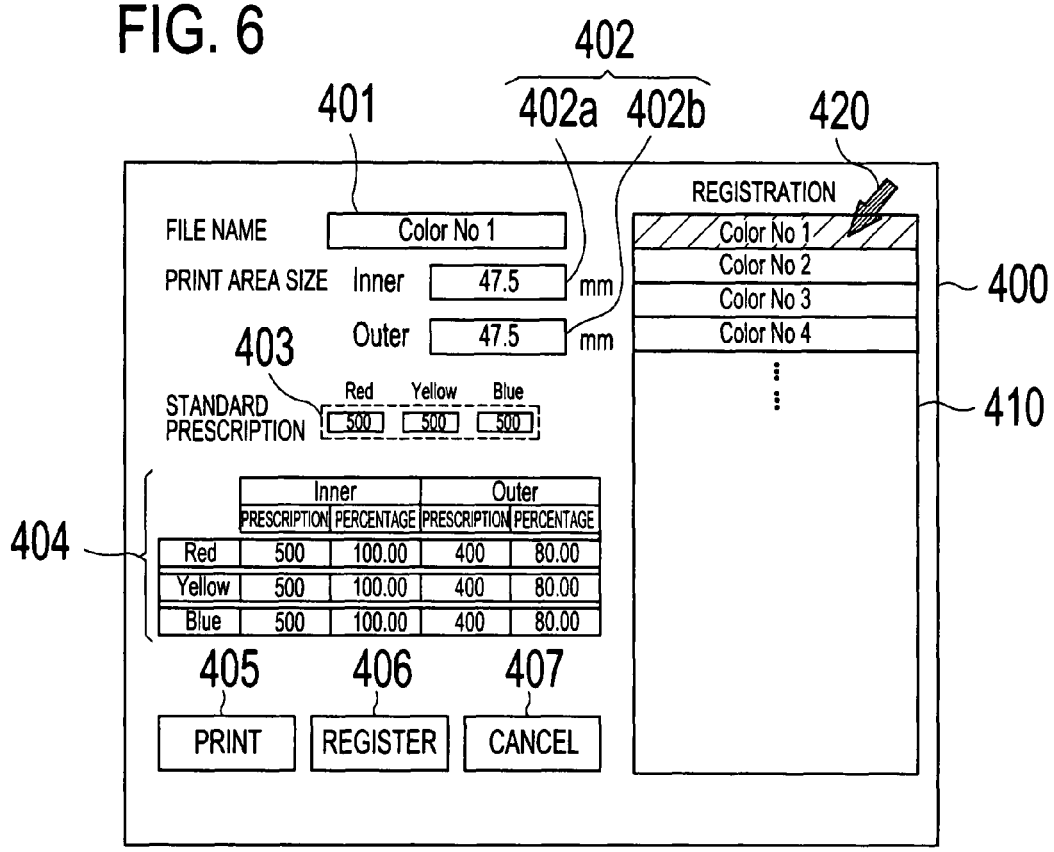

LENS DYEING METHOD AND APPARATUS FOR PRODUCING DYEING BASE BODY FOR DYEING LENS

BACKGROUND OF THE INVENTION

1. Field of the Invention

The present invention relates to a lens dyeing method and an apparatus for producing a dyeing base body for dyeing a lens.

2. Description of Related Art

As a method for dyeing plastic (synthetic resin) spectacle lenses, a dyeing method by dipping a lens in a dyeing solution (a dip dyeing method) has been known. This method, which has been used from long ago, has disadvantages such as poor working environments and difficulty in dyeing a lens made of a high refractive material. Therefore, the inventors of the present invention proposed a dyeing method in which dyeing inks containing sublimable dyes are applied onto a dyeing base body by a printer, an ink-applied surface of the base body and a surface of the lens to be dyed are placed facing each other in noncontact relation under substantially a vacuum condition, and the base body is heated to deposit the dyes onto the lens (hereinafter, referred to as a "vapor deposition transfer dyeing method"). See U.S. Pat. No. 6,520,999B1 (EP 1249334B1, JP2001-59950A), for example.

Spectacle lenses have curvatures determined by powers. Thickness of an edge of the lens is also determined by the power. For example, a low (weak) minus power lens is small in curvature and thus a lens peripheral portion (edge) is not so thick as compared with a lens central portion. On the other hand, a high (strong) minus power lens is large in curvature and thus a lens peripheral portion (edge) is thicker than a lens central portion, resulting in a large difference between a vertical distance from the base body to the lens central portion and a vertical distance from the base body to the lens peripheral portion. If this difference in distance is large, the vapor deposition transfer dyeing method conducted by depositing dyes onto a lens to dye the lens would have a difficulty in dyeing the lens surface to be dyed with almost uniform color density. Even in sunglasses having no power, the above disadvantage likely occurs due to a difference in curvature.

BRIEF SUMMARY OF THE INVENTION

The present invention has an object to provide a lens dyeing method capable of dyeing a lens with almost uniform color density irrespective of power, curvature, and others of the lens, and an apparatus for producing a dyeing base body for dyeing a lens.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the above object, the present invention provides a lens dyeing method comprising the steps of: (a) determining a print area to be formed on a dyeing base body based on information entered to dye a predetermined area of a surface of a lens to be dyed with desired hue and almost uniform color density so that the print area has a diameter larger than that of the lens surface area and the color density of the print area concentrically changes from a central portion to a peripheral portion in a stepwise or linear manner; (b) applying a dyeing ink containing a sublimable dye onto the base body to form the determined print area on one surface of the base body; and (c) placing the base body and the lens so that the print area formed surface and the lens surface area to be dyed face each other in noncontact relation under substantially a vacuum condition, and heating the base body to deposit the dye onto the lens.

According to another aspect, the present invention provides an apparatus for producing a dyeing base body for dyeing a lens, comprising: an input unit for entering information to dye a predetermined area of a surface of the lens to be dyed with desired hue and almost uniform color density; an arithmetic unit for determining a print area to be formed on the base body based on the entered information so that the print area has a diameter larger than that of the lens surface area to be dyed and the color density of the print area concentrically changes from a central portion to a peripheral portion in a stepwise or linear manner; and a print unit for applying a dyeing ink containing a sublimable dye onto the base body to form the determined print area on one surface of the base body.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 6 is a view showing another base body production screen.

DETAILED DESCRIPTION OF THE PREFERRED EMBODIMENTS

Figure 1:
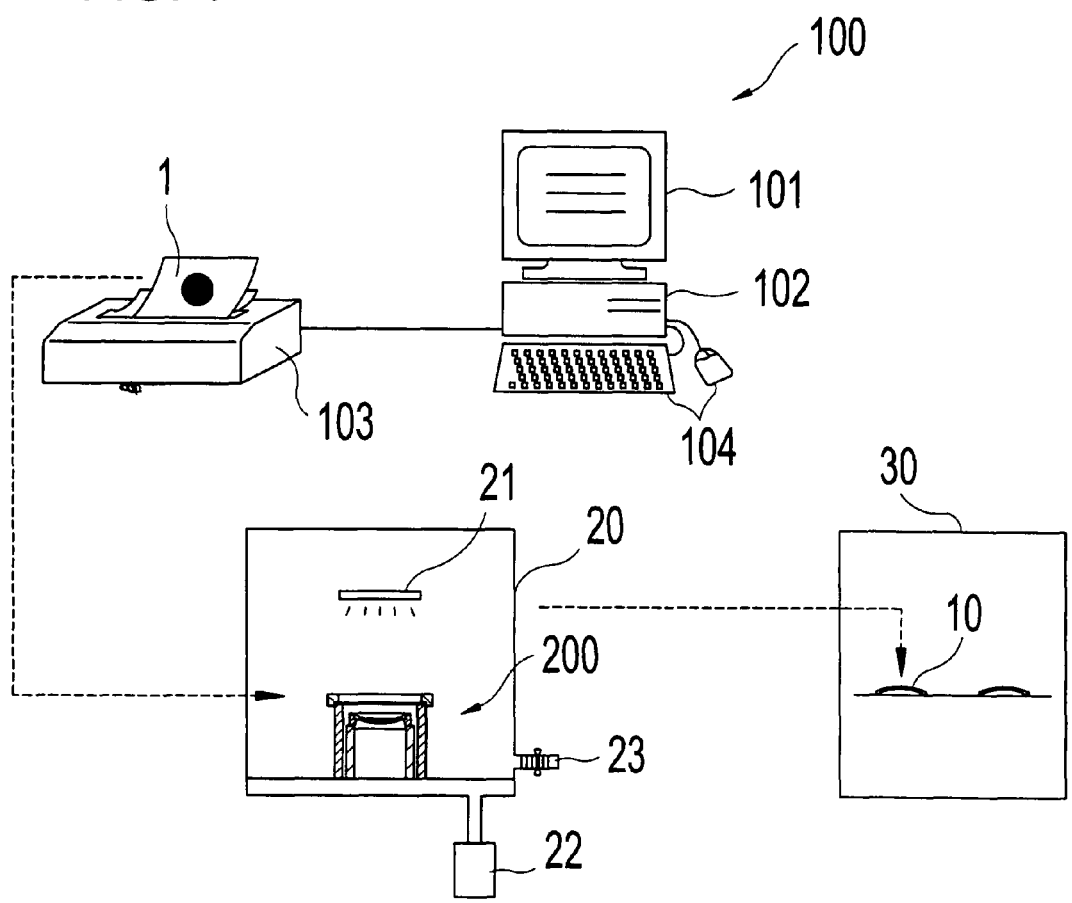
FIG. 1 is a schematic configuration view of a lens dyeing system including an apparatus for producing a dyeing base body for dyeing a lens.
Figure 2:
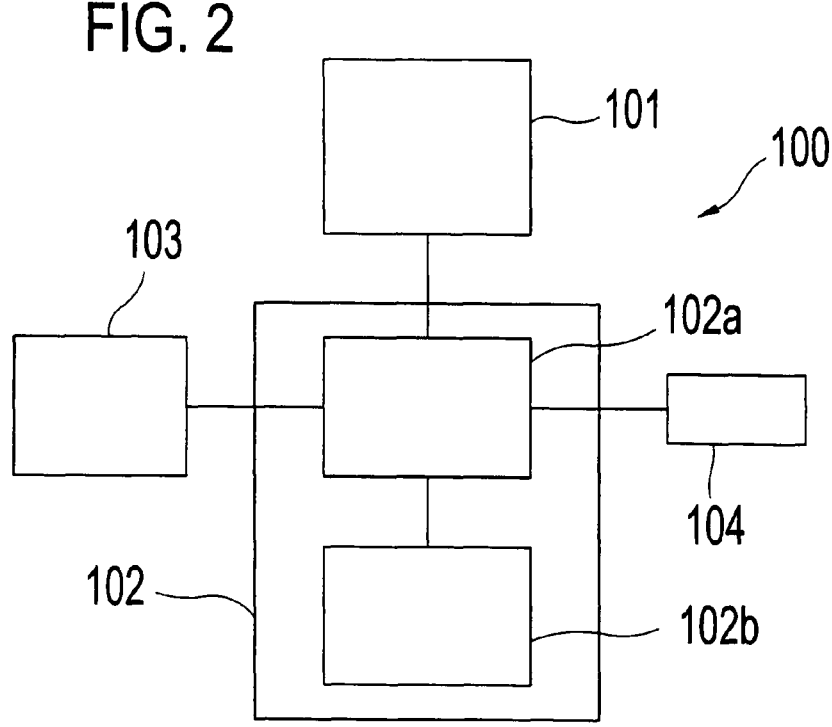
FIG. 2 is a schematic block diagram of a control system of the base body producing apparatus.

A detailed description of a preferred embodiment of the present invention will now be given referring to the accompanying drawings. FIG. 1 is a schematic configuration view of a lens dyeing system including an apparatus for producing a dyeing base body for dyeing a lens in the present embodiment. FIG. 2 is a schematic block diagram of a control system of the base body producing apparatus.

A base body producing apparatus 100 includes a monitor (a display unit) 101, a computer (an arithmetic unit) 102, and an inkjet printer (a printing unit) 103. An operation unit 104 such as a keyboard, a mouse, and so on also serves as an input unit for entering various information in the computer 102. This computer 102 is provided with an arithmetic control part 102$a$ having a CPU which carries out arithmetic operation and a memory part 102$b$ having a hard disc. The arithmetic control part 102$a$ controls the printer 103 by using a program for producing a dyeing base body 1, the program having been stored in the memory part 102$b$.

The base body 1 is paper or the like which is usable in the printer 103 and is applied (printed) with dyeing inks in a predetermined shape on one side (hereinafter, a "front surface"). Preferably, an opposite side (hereinafter, a "rear surface") of the base body 1 from the ink-applied surface (the front surface) is dark or black colored in order to increase heat absorption efficiency.

The dyeing inks are inks usable in the printer 103 and include at least three color inks, red (magenta), blue (cyan), and yellow. Each ink contains sublimable dyes (which are dissolved or fine-grained dispersed) capable of resisting heat during deposition and fixation. The dyes are preferably a quinophthalon sublimable dye or an anthraquinone sublimable dye.

A vapor deposition transfer device (a dye deposition device) 20 is configured to heat the base body 1 at a predetermined temperature under substantially a vacuum condition, thereby depositing the dyes onto a lens 10. This device 20 is provided with an open/close door not shown, a lamp 21 serving as a heat source placed in an upper part of the inside of the device 20, a dyeing jig 200 placed in a lower part of the inside of the device 20, a rotary pump 22 for forming substantially the vacuum condition in the inside of the device 20, and a leak valve 23 for bringing (returning) pressure of the inside to atmospheric pressure. The lamp 21 in the present embodiment is a halogen lamp, but may be any type if only it can heat the base body 1 in noncontact relation.

The lens 10 may be selected from any lenses made of a material such as polycarborate resin (e.g., diethylene glycol bisallyl carbonate polymer (CR-39)), polyurethane resin, allyl resin (e.g. allyl diglycol carbonate and its copolymer, diallyl phthalate and its copolymer), fumaric acid resin (e.g. benzyl fumarate copolymer), styrene resin, polymethyl acrylate resin, fibrous resin (e.g. cellulose propionate); and a high-refractive material such as thiourethane resin (MR-6 to 8), and thioepoxy resin (MR-174).

Figure 3:
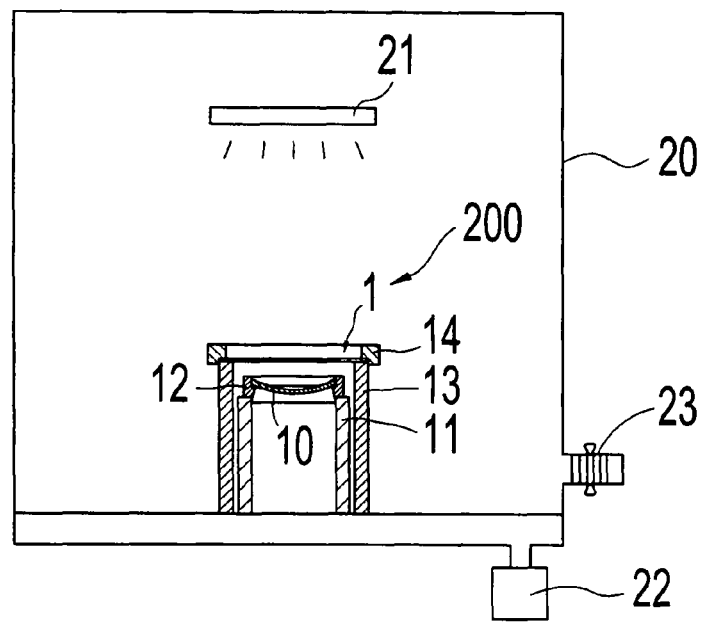
FIG. 3 is a schematic configuration view of a dyeing jig.

FIG. 3 is a schematic configuration view of the dyeing jig 200. A cylindrical support member 11 on which the lens 10 is put is placed inside a cylindrical support member 13 on which the base body 1 is put. In the case where a rear refractive surface of the lens 10 is to be dyed, an outer edge of a front refractive surface of the lens 10 is supported on a cylindrical holder 12 placed on the support member 11. The base body 1 put on the support member 13 is fixedly retained with the outer edges of the front and rear surfaces caught between the support member 13 and a retainer 14. In this state, the base body 1 is placed so that the ink-applied surface faces the surface of the lens 10 to be dyed in noncontact relation. According to the vapor deposition transfer dyeing method, if the distance between the base body 1 and the lens 10 is too short or too long, dye deposition is insufficient (nonuniform), which causes dyeing irregularity. Therefore, the vertical distance from the ink-applied surface of the base body 1 to a geometric center of the surface of the lens 10 to be dyed is preferably 5 mm to 30 mm, more preferably, 5 mm to 20 mm.

An oven (a dye fixing device) 30 is configured to heat the lens 10 with the dyes deposited thereon at a predetermined temperature under atmospheric pressure to fix the dyes on the lens 10.

The process for dyeing a lens by the vapor deposition transfer dyeing method using the aforementioned dyeing system will be explained below.

Firstly, a production step of the base body 1 is explained.

The base body producing program is started on the computer 102, and a base body production screen 300 (see FIG. 4) is displayed on the monitor 101. On the screen 300, buttons 301a to 301c are used to enter (set or select) ink application (print) conditions of the base body 1 to be output from the printer 103. The button 301a is used to enter (set or select) the material of the lens 10, for example, information about materials such as MR-174, CR-39, and MR-8. Such entered information appears in a box 302a. The button 301b is used to enter (set or select) the color density of the lens 10, for example, one of color density codes of lens color samples prepared in a spectacles maker or the like. Such entered information appears in a box 302b. The button 301c is used to enter (set or select) the hue of the lens 10, for example, one of hue codes of the lens color samples prepared in the spectacles maker or the like. Such entered information appears in a box 302c.

Figure 4:
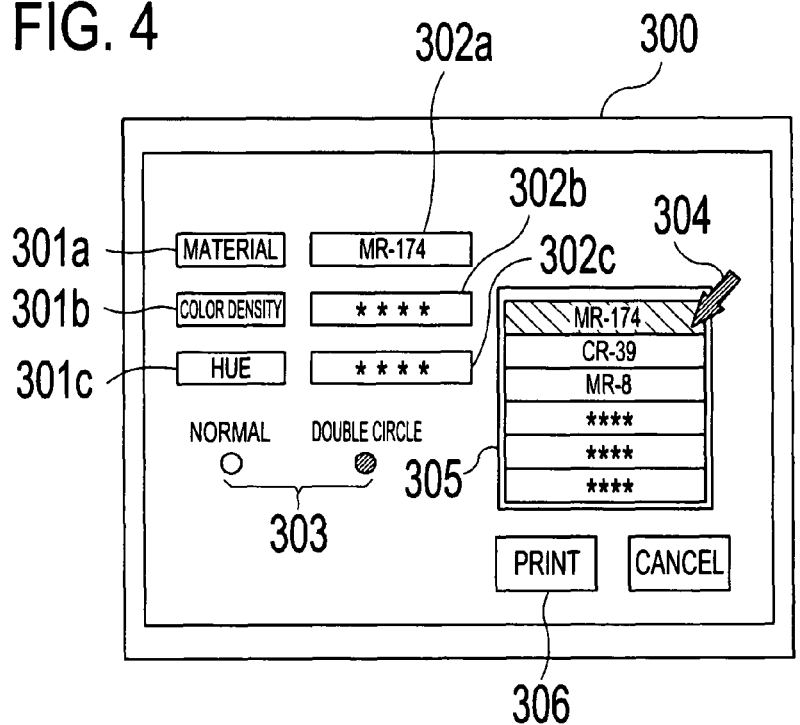
FIG. 4 is a view showing a base body production screen.

Entry of the conditions is performed by moving a cursor 304 appearing on the screen 300 with the mouse and clicking the buttons 301a to 301c. In the memory part 102b, information inputtable with the buttons 301a to 301c are stored (registered) in advance. With a click of any one of the buttons 301a to 301c, the arithmetic control part 102a retrieves a registration list corresponding to the clicked button and opens a window 305. In FIG. 4, the window 305 which can be displayed with a click of the button 301a appears. The arithmetic control part 102a displays information selected on the window 305 in the box 302a. Similarly, the buttons 301b and 301c are clicked to enter other conditions.

Prior to outputting of the base body 1 from the printer 103, a radio button 303 serving as a print pattern selecting part is used for selecting either one of a first print pattern ("NORMAL" pattern) in which a printed area has color density unchanged from the central portion toward the peripheral portion (that is, uniform over the central portion and the peripheral portion) and a second print pattern ("DOUBLE CIRCLE" pattern) in which a printed area has color density which changes from the central portion toward the peripheral portion.

According to the vapor deposition transfer dyeing method in which the base body 1 and the lens 10 are placed facing each other and spaced at a predetermined distance from each other, and the dyes are deposited onto the lens 10 to dye it, if the lens 10 has high (strong) minus power and a thick edge (large curvature), the vertical distance between the ink-applied surface of the base body 1 and the central portion of the surface of the lens 10 to be dyed largely differs from the vertical distance between the ink-applied surface of the base body 1 and the peripheral portion of the surface of the lens 10 to be dyed. This may result in an unintended difference in color density between the central portion and the peripheral portion of the dyed surface of the lens 10.

In the present embodiment, therefore, if the lens 10 has low (weak) minus power (small curvature), the "NORMAL" (the "NORMAL" pattern) of the button 303 is selected. If the lens 10 has high (strong) minus power (large curvature, e.g., 8 or more base curve), the "DOUBLE CIRCLE" (the "DOUBLE CIRCLE" pattern) of the button 303 is selected. In the case of sunglasses or the like having no power but large curvature, the "DOUBLE CIRCLE" is selected.

When the print button 306 is clicked, the arithmetic control part 102a controls the printer 103 to eject inks from ink cartridges based on the conditions entered with the buttons 301a to 301c, thereby forming a predetermined-shaped print area on the base body 1 such as paper. If the "NORMAL" of the button 303 is previously selected, the printer 103 is controlled to form a single circular print area having a slightly larger diameter than that of the surface of the lens 10 to be dyed (the predetermined surface area of the lens 10 to be dyed). If the "DOUBLE CIRCLE" of the button 303 is previously selected, the printer 103 is controlled to form a print area including double concentric circles having the same hue but different color densities.

Figure 5A:
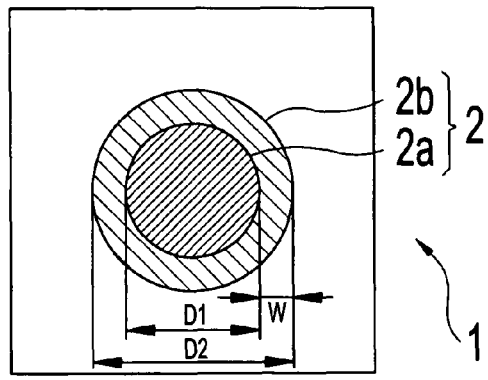
FIGS. 5A and 5B are views showing examples of produced dyeing base bodies.

FIG. 5A is a view showing an example of the base body 1 produced under a condition that the "DOUBLE CIRCLE" of the button 303 is selected. An inner print area (a central print area) 2a is a circular print area having a smaller diameter D1 than that of the surface of the lens 10 to be dyed (the predetermined surface area of the lens 10 to be dyed). An outer print area (a peripheral print area) 2b is an annular print area having a larger diameter D2 than that of the surface of the lens 10 to be dyed. Specifically, the width W of the annular print area 2b is (D2−D1)/2. The print area 2b is formed in the same hue as that of the print area 2a and in lower color density than that of the print area 2a.

A ratio of diameters, a difference in color density, and others between the print area 2a and the print area 2b may be stored in the memory part 102b in the following manner. Lenses having so curved surfaces as to influence uniform dyeing are dyed under various conditions. Such conditions as to minimize the difference in color density between the central portion and the peripheral portion of the dyed lens (the difference in color density is preferably 5% or less, more preferably 3% or less, and most preferably 1% or less) are quantitatively determined. The conditions are stored as forming conditions of the print areas 2a and 2b (ink application conditions) in the memory part 102b. For example, the diameter D1 of the print area 2a is determined to be about 50% to about 70% of the diameter D2 of the print area 2b and the color density of the print area 2b is determined to be about 40% to about 80% of the color density of the print area 2a.

In the present embodiment, the print area including double circles having the same hue but different color densities is formed in order to dye a high power lens (large curvature lens), but any other form may be adopted. The print area 2b may be formed with color density changing stepwise toward the peripheral portion so that the difference in color density from the print area 2a is gradually increased. Further, the print area 2 may be formed with color density concentrically changing from the central portion toward the peripheral portion not only in a stepwise manner but also in a linear manner. A color density curve (changing degree) in this case is determined in consideration of the distance (space) between the base body 1 and the lens 10 which changes from the central portion to the peripheral portion.

Figure 5B:
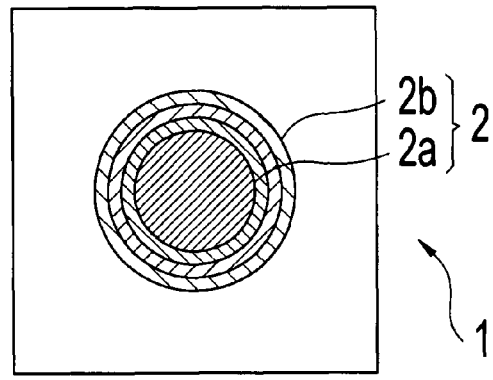

For example, the print area 2b in FIG. 5B is formed with color density which becomes lower in three steps toward the peripheral portion. The print area 2b may be formed in not only a circular (annular) shape but also any other shape, such as a rectangular shape, which has only to be larger in diameter than the lens 10. Further, a pair of print areas 2 for right and left lenses may be formed on a single base body 1.

In the vapor deposition device 20, the produced base body 1 and the lens 10 are placed facing each other in noncontact relation by use of the jig 200. The device 20 is hermetically closed and evacuated to substantially a vacuum (about 0.1 kPa to about 5 kPa) by the pump 22. It is to be noted that the vacuum may be less than 0.1 kPa, but it requires a high-performance exhauster. Further, as the internal pressure of the device 20 increases, the temperature required to sublimate the dyes becomes higher. Accordingly, the vacuum is preferably 0.1 to 5 kPa and more preferably 0.1 to 3 kPa.

When the internal pressure of the vapor deposition transfer device 20 becomes a predetermined vacuum, the lamp 21 is turned on to heat the base body 1. The dyes are then sublimated from the print area 2 and deposited on the surface of the lens 10 to be dyed. A heating time by the device 20 (the lamp 21) is a time during which most of the dyes of the print area 2 can sublimate and are deposited therefrom. A heating temperature by the device 20 (the lamp 21) is preferably as high as possible which cannot cause deterioration of the dyes, deformation of the lens 10, and so on.

After completion of heating by the lamp 21, the lamp 21 is turned off, the valve 23 is opened, and the lens 10 is brought out of the vapor deposition transfer device 20.

Successively, the lens 10 on which the dyes are deposited is heated in the oven 30 for a predetermined time to produce desired hue and color density. A heating temperature by the oven 30 is preferably as high as possible which cannot cause deterioration of the dyes, deformation of the lens 10, and so on.

In the present embodiment, the dyes are deposited onto a concave surface of the lens. Alternatively, the dyes may be deposited onto a convex surface of the lens. In this case, to dye the surface of the lens to be dyed with almost uniform color density, the color density of the print area 2 has to be higher in the peripheral portion than the central portion.

In the present embodiment, furthermore, during entry of various conditions for producing the base body 1, a combination of two print areas different in color density is set at operator's judgment based on power, curvature, and others, of the lens 10, but the present invention is not limited thereto. The arithmetic control part 102a may be arranged to judge the forming conditions of the print area based on the entered information. In this case, at least one of informations such as material, power, curvature, etc. is stored in the memory part 102b. Simultaneously, it may be arranged such that a setting button for entering at least one of the above informations is provided on the base body production screen, and the arithmetic control part 102a determines the forming condition of the print area based on the entered information by the setting button to reflect the determined condition in producing the base body 1.

Furthermore, the base body producing program may be used to enter detailed forming condition of the print area. In a base body production screen 400 (see FIG. 6), which is displayed on the monitor 101 when the base body producing program is started, a file name entry box 401 is used to enter a name of a registration file for setting the print area 2 in detail. A print area size entry box 402 is used to enter size of the print area 2. An "INNER" box 402a of the box 402 is used to enter size of the inner print area 2a, in which the diameter D1 is entered in the present embodiment. An "OUTER" box 402b of the box 402 is used to enter size of the outer print area 2b, in which the width W is entered in the preset embodiment. Thus, the size of each print area 2a and 2b is determined.

A standard prescription box 403 is used to determine the hue and color density of the print area 2a and enter an amount of ejection of each of the red, blue, and yellow inks from each cartridge. The amount of ejection per unit area can be entered in a range of 0 to 1024 dots. The print area 2 is then printed and formed in resultant color of the inks combined based the prescription which is an entered value.

A detailed prescription box 404 is used to change the hue and color density of each print area 2a and 2b. The prescription of each color ink can be entered for the print areas 2a ("INNER") and 2b ("OUTER") respectively. Further, a "PERCENTAGE" of each color ink can be changed, assuming that each prescription value in the box 403 is 100%. A "PRESCRIPTION" value and a "PERCENTAGE" value are correlated to each other so that if either one of them is changed, the other one is automatically changed. Specifically, when the "PRESCRIPTION" value of the "INNER" side in the box 404 remains unchanged from the entered value (500 dots) in the box 403 and the "PRESCRIPTION" value of the "OUTER" side in the box 404 is changed from the entered value (changed from 500 dots to 400 dots) so that the color density becomes slightly lower, the "PERCENTAGE" value of the "OUTER" side is automatically changed and displayed as 80.00%. To the contrary, if the "PERCENTAGE" value is changed, the "PRESCRIPTION" value is automatically changed and displayed.

Entry in each box is performed in the following manner. Specifically, the mouse is moved to point the cursor 420 appearing on the screen 400 to any one of the boxes, the selected box is clicked, enabling the entry, and a value or the like is entered with a keyboard (numeric keypad). With a click of the print button 405, the arithmetic control part 102*a* controls the printer 103 based on the entered various conditions to produce the base body 1.

With a click of the registration button 406, the entered conditions are stored in the memory part 104 and a file name entered in the box 401 is displayed in the registration box 410. It is to be noted that a cancel button 407 is used to cancel the entered conditions.

The base body production screen 400 in FIG. 6 is designed for entering the size and color density of each of two print areas. Alternatively, the screen may be configured for entering more than two print areas and more various conditions.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A lens vapor deposition transfer dyeing method of dyeing a surface area of a spectacle lens with almost uniform color density, the lens having a large difference between a distance from a dyeing base body to a central portion of the lens surface area and a distance from the dyeing base body to a peripheral portion of the lens surface area, the method comprising the steps of:

a. selecting a method of forming a dye applied area on the dyeing base body with almost uniform color density changing from a central portion to a peripheral portion of the dye applied area in a stepwise or linear manner, the step (a) including selecting dye application with color density changing that is lower in the peripheral portion than in the central portion when the lens surface area to be dyed is a concave surface and dye application with color density changing that is higher in the peripheral portion than in the central portion when the lens surface area to be dyed is a convex surface;

b. entering dyeing information including color information in a computer, and obtaining dye application data for a printer to change the color density in a stepwise or linear manner from the central portion to the peripheral portion of the dye applied area having a diameter larger than that of the lens surface area to be dyed based on the entered dyeing information;

c. applying a dyeing ink containing a sublimable dye by the printer onto one surface of the dyeing base body based on the dye application data to form the dye applied area on one surface of the dyeing base body;

d. placing the dyeing base body and the lens so that the dye applied area formed surface and the lens surface area face each other in noncontact relation and heating the dyeing base body under substantially a vacuum condition to deposit the dye of the dye applied area onto the lens surface area; and e. heating the deposited dye to fix the dye on the lens surface area.

\* \* \* \* \*